United States Patent
Hsu et al.

(10) Patent No.: US 9,235,528 B2
(45) Date of Patent: Jan. 12, 2016

(54) WRITE ENDURANCE MANAGEMENT TECHNIQUES IN THE LOGIC LAYER OF A STACKED MEMORY

(71) Applicant: Advanced Micro Devices, Inc., Sunnyvale, CA (US)

(72) Inventors: Lisa R. Hsu, Kirkland, WA (US); Gabriel H. Loh, Bellevue, WA (US); Michael Ignatowski, Austin, TX (US); Michael J. Schulte, Austin, TX (US); Nuwan S. Jayasena, Sunnyvale, CA (US); James M. O'Connor, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 147 days.

(21) Appl. No.: 13/725,305

(22) Filed: Dec. 21, 2012

(65) Prior Publication Data

US 2014/0181457 A1    Jun. 26, 2014

(51) Int. Cl.
*G06F 11/00* (2006.01)
*G06F 12/10* (2006.01)
*G06F 11/20* (2006.01)
*G06F 11/16* (2006.01)

(52) U.S. Cl.
CPC .......... *G06F 12/10* (2013.01); *G06F 11/2094* (2013.01); *G06F 11/1666* (2013.01)

(58) Field of Classification Search
CPC .................... G06F 11/1666; G06F 11/2094
USPC .................... 711/105, 202; 714/6.32
See application file for complete search history.

(56) References Cited

U.S. PATENT DOCUMENTS

| | | | |
|---|---|---|---|
| 7,697,366 B2 * | 4/2010 | Fasoli et al. | 365/230.06 |
| 8,370,566 B2 * | 2/2013 | Danilak et al. | 711/103 |
| 2007/0220207 A1 * | 9/2007 | Black et al. | 711/118 |
| 2009/0204777 A1 * | 8/2009 | Norman | 711/163 |
| 2010/0064111 A1 * | 3/2010 | Kunimatsu et al. | 711/161 |
| 2011/0246700 A1 * | 10/2011 | Norman | 711/102 |
| 2011/0264858 A1 * | 10/2011 | Jeddeloh et al. | 711/114 |
| 2011/0289266 A1 * | 11/2011 | Biswas et al. | 711/103 |
| 2012/0191900 A1 * | 7/2012 | Kunimatsu et al. | 711/103 |
| 2012/0265929 A1 * | 10/2012 | Norman | 711/103 |
| 2012/0278543 A1 * | 11/2012 | Yu et al. | 711/103 |
| 2013/0013886 A1 * | 1/2013 | Franceschini et al. | 711/202 |
| 2013/0060996 A1 * | 3/2013 | Berke | 711/105 |
| 2014/0040576 A1 * | 2/2014 | Cordero et al. | 711/162 |

* cited by examiner

*Primary Examiner* — Than Nguyen
(74) *Attorney, Agent, or Firm* — Volpe and Koenig, P.C.

(57) ABSTRACT

A system, method, and memory device embodying some aspects of the present invention for remapping external memory addresses and internal memory locations in stacked memory are provided. The stacked memory includes one or more memory layers configured to store data. The stacked memory also includes a logic layer connected to the memory layer. The logic layer has an Input/Output (I/O) port configured to receive read and write commands from external devices, a memory map configured to maintain an association between external memory addresses and internal memory locations, and a controller coupled to the I/O port, memory map, and memory layers, configured to store data received from external devices to internal memory locations.

19 Claims, 5 Drawing Sheets

WRITE ENDURANCE MANAGEMENT TECHNIQUES IN THE LOGIC LAYER OF A STACKED MEMORY

FIELD

The embodiments are generally directed to addressing memory locations in stacked memory. More particularly, the embodiments are directed to changing the mapping of external memory address to internal memory locations for stacked memory.

BACKGROUND

Memory comprises thousands of cells where information can be stored to be used later. In order to use memory effectively, external devices need to be able to identify where information is stored and need to be able to reliably store information at one point in time and retrieve the same information at a later point in time.

But many memory technologies are subject to some write limitations due to deterioration and damage to memory locations over time, whereby a memory cell cannot be reliably written to (or read from) anymore. For example, some memory locations may suffer from fabrication defects and may never be able to store information. In other cases, memory can be worn out or exhausted. For example, after a number of memory writes to a given memory cell, that cell may wear out and no longer be able to reliably store information. For some memory technologies, such as Dynamic Random Access Memory (DRAM), the number of memory writes required to wear out a given cell can be very large, effectively infinite given today's usage models. But in other technologies, such as Flash and Phase Change Memory (PCM), the number of memory writes required to wear out a given cell can be much smaller, easily exceeded given today's usage models.

Currently, when a cell in a memory can no longer be written to reliably, there are limited ways of fixing this problem. The most simple solution would be to replace the memory. But this can be a costly solution when addressing the failure of a single memory cell in a memory containing millions or billions of other memory cells. Or, the external device using the memory may be able to identify unreliable memory and avoid writing to that location. But this solution requires that the external device have additional logic to detect failing memory locations and the ability to direct memory writes from one location in memory to another. Oftentimes this requires a separate memory controller. Some memory has been created that combines both memory and the logic to remap the memory on the same chip. But due to the different manufacturing processes required to make either efficient memory cells or efficient logic, the performance of the transistors in these hybrid chips is inferior to separate memory or logic. In addition, this design incurs significant costs.

BRIEF SUMMARY

Therefore, there is a need for an efficient way to mitigate the effects of multiple writes to a same memory address and move memory addresses to different memory locations without assistance from any external devices.

A system, method, and memory device embodying some embodiments for remapping external memory addresses and internal memory locations in stacked memory are provided. The stacked memory includes one or more memory layers configured to store data. The stacked memory also includes a logic layer connected to the memory layer. The logic layer has an Input/Output (I/O) port configured to receive read and write commands from external devices, a memory map configured to maintain an association between external memory addresses and internal memory locations, and a controller coupled to the I/O port, memory map, and memory layers, configured to store data received from external devices to internal memory locations.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate some embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

DETAILED DESCRIPTION

The following detailed description refers to the accompanying drawings that illustrate exemplary embodiments. Other embodiments are possible, and modifications can be made to the embodiments within the spirit and scope of the disclosed embodiments. Therefore, the detailed description is not meant to limit the scope of the embodiments. Rather, the scope of the claimed subject matter is defined by the appended claims.

It would be apparent to a person skilled in the relevant art that the embodiments, as described below, can be implemented in many different embodiments of software, hardware, firmware, and/or the entities illustrated in the figures. Thus, the operational behavior of embodiments will be described with the understanding that modifications and variations of the embodiments are possible, given the level of detail presented herein.

This specification discloses one or more systems that incorporate the features of the embodiments. The disclosed systems merely exemplify the embodiments. The scope of the embodiments is not limited to the disclosed systems. The embodiments are defined by the claims appended hereto.

The systems described, and references in the specification to "one system", "a system", "an example system", etc., indicate that the systems described may include a particular feature, structure, or characteristic, but every embodiment may not necessarily include the particular feature, structure, or characteristic. Moreover, such phrases are not necessarily referring to the same system. Further, when a particular feature, structure, or characteristic is described in connection with a system, it is understood that it is within the knowledge of one skilled in the art to affect such feature, structure, or characteristic in connection with other embodiments whether or not explicitly described.

1. Stacked Memory Computer System.

Figure 1:
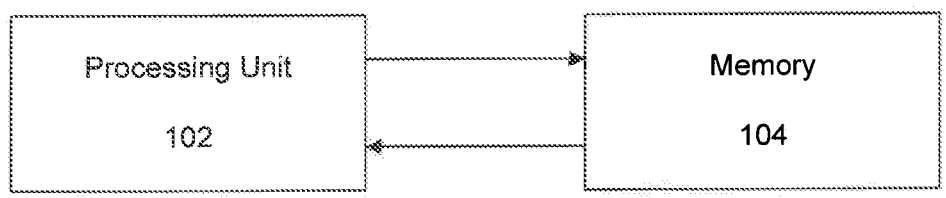
FIG. 1 is an illustration of an exemplary computer system in which embodiments can be implemented.

FIG. 1 shows a computer system 100, in which embodiments described herein can be implemented. In this example, computer system 100 includes a processing unit 102 that is communicatively coupled to a memory 104.

Processing unit 102 can be, for example and without limitation, a central processing unit (CPU), graphics processing unit (GPU), advanced processing unit (APU), field programmable gate array (FPGA), application specific integrated circuit (ASIC), or similar processing units.

Memory 104 can be a stacked memory device. For example, a stacked memory device can include one or more layers of memory. A stacked memory device can also include one or more logic layers. In some embodiments, each layer of the one or more layers of memory and the one or more logic layers is included in a separate and distinct integrated circuit (IC) die. In these embodiments, the one or more logic layers (e.g., one or more IC dies including one or more logic layers) and the one or more layers of memory (e.g., the one or more IC dies including the one or more layers of memory) are stacked on top of each other. Through silicon vias may be used to couple the one or more layers of memory and the one or more logic layers with each other.

2. Stacked Memory Device

Figure 2:
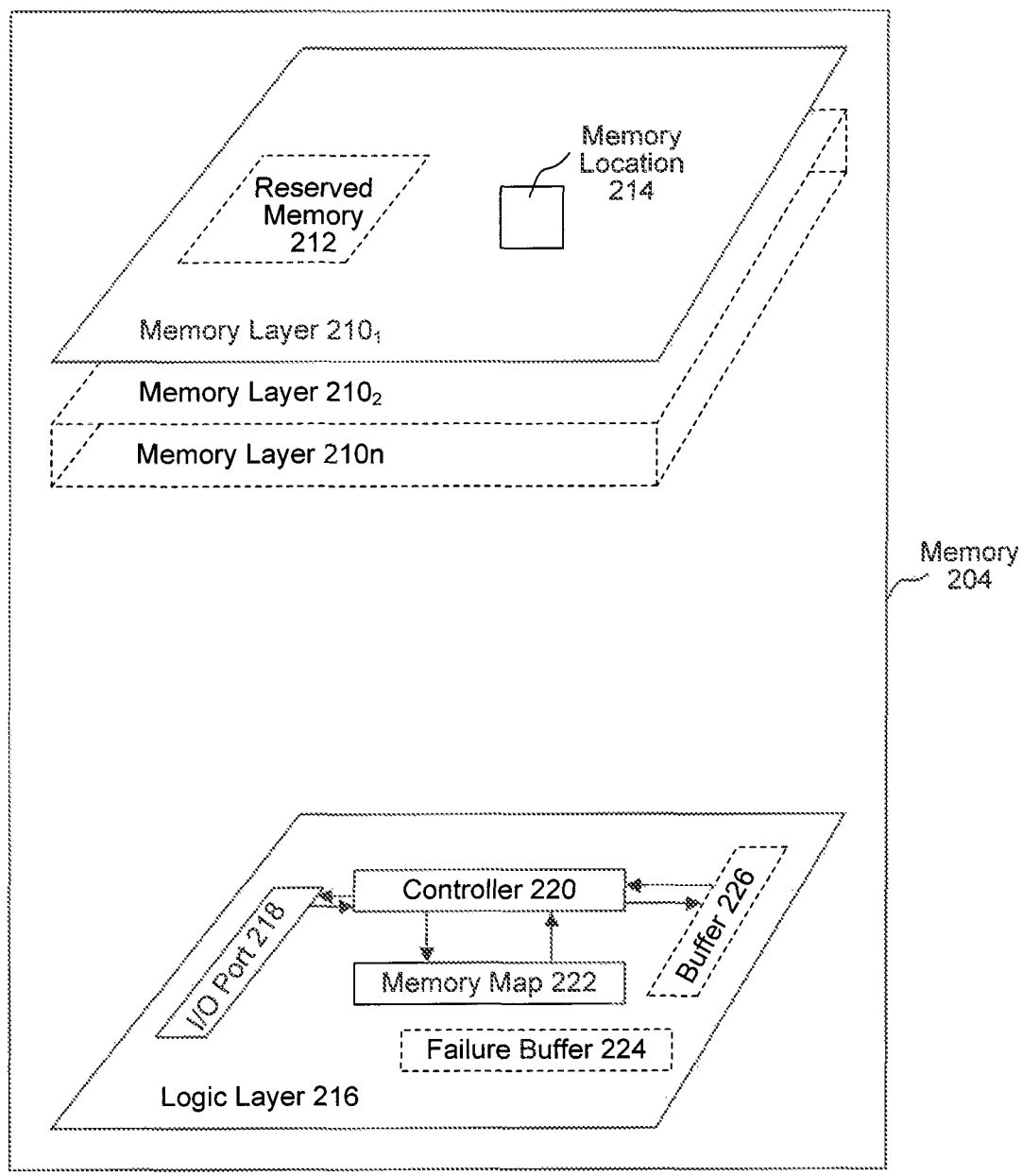
FIG. 2 is an illustration of a stacked memory device that can remap physical addresses according to an embodiment.

FIG. 2 shows a memory device 200, according to an embodiment. In one example, memory device 200 includes memory 204, memory layer(s) 210, and logic layer 216. Memory layer(s) 210 can include reserved memory 212 and memory location 214. Logic layer 216 can include input/output (I/O) port 218, controller 200, and memory map 222. Additionally, optional elements failure buffer 224 and buffer 226 can be included on the logic layer 216.

In an embodiment, memory device 200 can dynamically remap memory addresses requested by external devices to different physical locations within memory device 200. In one example, memory device 200 can initially map external memory address 0x00000000 to memory location 0x00001000. It can then remap external memory address 0x00000000 from memory location 0x00001000 to memory location 0x00002000. Remapping can alleviate issues related to memory deterioration, such as memory burnout and memory failure. Remapping can also allow memory device 200 to more uniformly distribute memory accesses. In one example, memory device 200 can remap some locations in a high traffic area of a memory layer to a low traffic area of the memory layer. Thus, remapping can be used to spread memory accesses across the entire physical area of memory. Substantial uniform distribution of memory writes can alleviate the effects of multiple memory access to one memory location.

In an embodiment, memory 204 can include one or more additional memory layers $210_2$-$210_n$. In an embodiment, each of the one or more additional memory layers $210_2$-$210_n$ can be identical to any of the other memory layers $210_1$-$210_n$, or they can be different. In one example, the memory layers $210_1$-$210_n$ can include different types of memory layers, such as a memory layer with high write endurance, e.g., dynamic random access memory (DRAM), and a memory layer with low write endurance, e.g., phase change memory (PCM) or flash memory. In another example, the memory layers $210_1$-$210_n$ can be of different sizes, such as a memory layer with 1 gigabyte (GB) of memory and a memory layer of 10 GBs of memory. These examples are provided for mere convenience, and it should be understood that the embodiments are not limited to these examples and can include other differences in memory, or a combination of differences in memory.

In one example, memory location 214 can be any memory location in memory layer 210. Memory location 214 can be any portion in memory layer 210, for example any bit, byte, word, double word, quad word, or other region of memory. In one example, different memory locations in the memory layers can be different sizes.

In an embodiment, reserved memory 212 can be memory that is not initially accessible by external devices, and is reserved to replace memory locations that fail. For example, memory device 200 may have a 1 GB region of memory available to external devices, i.e., external devices perceive memory device 200 to have 1 GB of memory. In one example, memory device 200 may also have an additional 1 Megabyte (MB) region of reserved memory 212 that is effectively hidden from external devices.

In one example, if a memory location within the visible 1 GB of memory were to fail, memory device 200 could transparently use a equivalent sized portion of the hidden 1 MB to emulate the failing region. When an external device reads from or writes to the failing location in memory, memory device 200 could reroute that request to the portion of the reserved memory 212 that is emulating the failing region. Thus, from an external point of view, memory device 200 remains a 1 GB storage device.

In one example, I/O port 218 can be used to receive memory requests from external devices. The requests can be, for example, requests to write data to a memory address and requests to read data from a memory address.

In one example, controller 220 manages associating external memory addresses with internal memory locations, as well as storing and retrieving data from the memory layers. Controller 220 manages the memory in memory layer 210 using memory map 222 to track mapping between external memory addresses with memory locations in memory layer 210.

In an embodiment, controller 220 can also use buffer 226 to reduce how many times data is written to a particular memory location. For example, the controller stores all write requests directed to the same memory address in the buffer over a certain number of requests or over a certain period. Then, after the number or time duration is met, the next or last write request is processed, and the data is written to the memory location. This operation can reduce the wear on memory layer 210 by storing the writes in buffer 226 and only writing the final piece of data to the memory location.

In an embodiment, controller 220 can use failure buffer 224 to maintain a list of memory locations that have failed, e.g., during manufacturing or due to burn out. By maintaining this list, controller 220 can avoid mapping memory addresses to failed memory locations in the memory layers when remapping memory addresses to memory locations, as discussed in more detail below.

3. Memory Stack Remapping Process

Figure 3:
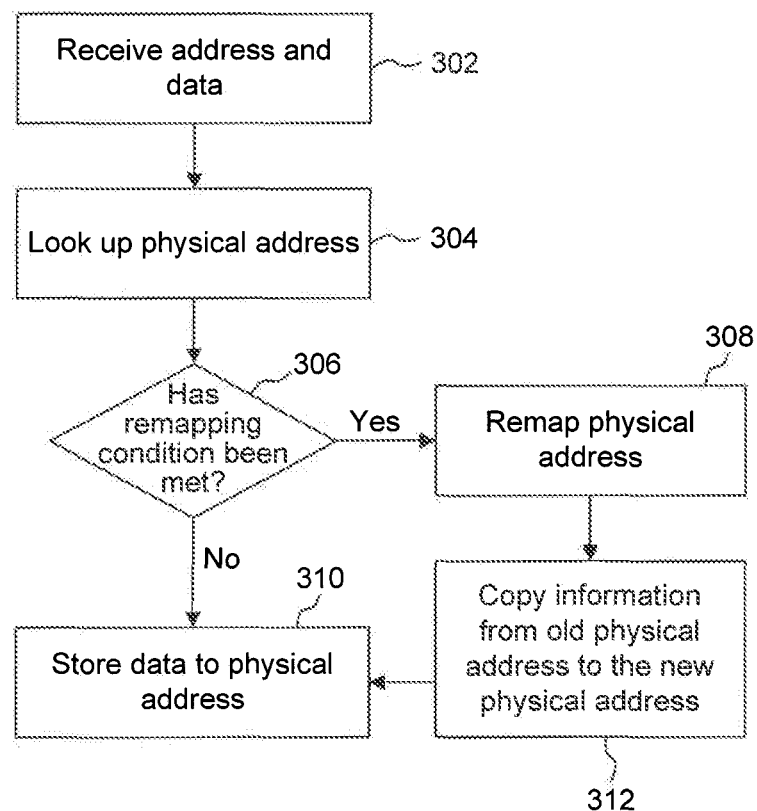
FIG. 3 is an illustration of an embodiment of a method of remapping physical addresses based on write leveling according to an embodiment.

FIG. 3 shows a flowchart depicting a method 300, according to an embodiment. For example, method 300 can be used to allow a memory device to remap external memory addresses to different memory locations within memory layers as discussed above. In one example, method 300 may be performed by memory 204 to remap external memory addresses to different locations within memory layer 210. It is to be appreciated that method 300 may not be performed in the order shown, or require all of the operations shown. Merely for convenience, and without limitation, method 300 is described with reference to FIGS. 1-2.

In step 302, a memory device receives a request to store data at a memory address. For example, processing unit 102 may, in response to a store instruction, send a request to store data at a memory address to memory 104.

In step 304, a controller, for example controller 220, determines a memory location associated with the received memory address. For example, controller 220 may look up the memory address in a memory map, e.g., memory map 222, to determine the associated memory location.

In step 306, the controller determines if any of the conditions have been met that signal that the memory address needs to be remapped to a new memory location. In one example, the condition for remapping the memory layer is implementation dependent. For example, if the memory layer has a low write endurance, the conditions may include allowing only a few writes to the memory location before requiring the memory address to be remapped. Thus, the conditions can include exceeding a write threshold for a memory location, for example a bit, a byte, a word, or any other given region of memory. In another example, the conditions can also include exceeding a time threshold, for example from the last remapping. The controller can track one or more of many different conditions, including pseudo-random decisions, software input conditions, and other conditions.

In step 308, if the remapping conditions have been met, the controller remaps the memory address to a new memory location. The controller can determine the number of conditions required to be met. For example, controller 220 can require that only one condition be met, that all conditions be met, or that some combination of conditions be met. For example, after five memory writes to the same memory address, controller 220 may remap the memory address to a new memory location in memory layer 210. In one example, the conditions can be used to allow controller 220 to maintain a uniform or substantially uniform distribution of memory writes across memory layer 210. In another example, controller 220 can map the memory address to a new location that is not currently mapped. In another example, controller 220 can map the memory address to a new memory location that is not in a failure buffer, as discussed in more detail below.

In step 312, the controller copies information from an old memory location to a new memory location. The copying of data provides a mechanism to maintaining data integrity while allowing for remapping of regions of memory that are larger than the data being written. In one example, the controller remaps 1 MB blocks of data, but the remapping condition may have only been met for one byte of data. In this example, after identifying that the remapping conditions have been met for the one byte of data, the controller remaps the entire 1 MB block of data containing the one byte of data, and copies all of the data from the old 1 MB memory location to the new 1 MB memory location.

In step 310, either if the remapping criterion has not been met or after the memory has been copied, the controller stores the data to be written to the new memory location.

4. Memory Stack Buffering Process

Figure 4:
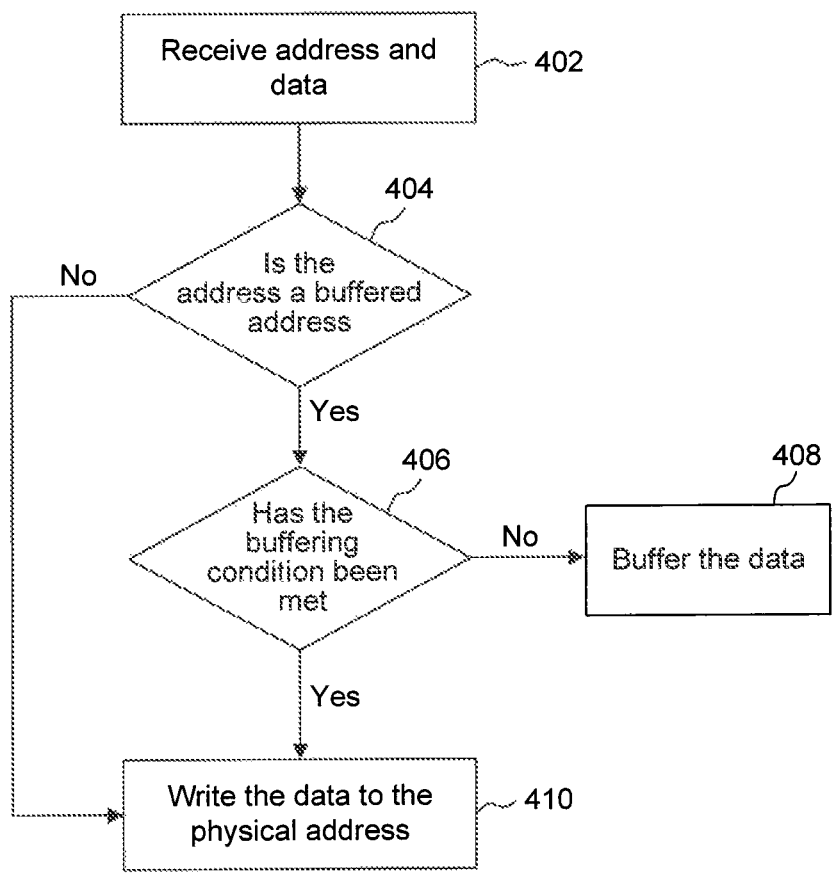
FIG. 4 is an illustration of an embodiment of a method of remapping physical addresses based on write coalescing according to an embodiment.

FIG. 4 shows a flowchart depicting a method 400 according to an embodiment. For example, method 400 can be used to allow a memory device to buffer memory writes to the same memory address, as discussed above. In one example, method 400 may be performed by memory 104, to buffer multiple memory writes by processing unit 102 to the same external memory address. It is to be appreciated that method 400 may not be performed in the order shown, or require all of the operations shown. Merely for convenience, and without limitation, method 400 is described with reference to FIGS. 1-2.

In step 402, a memory device receives a request to store data at a memory address. For example, processing unit 102 can, in response to a store instruction, send a request to store data at a memory address to memory 104.

In step 404, a controller, for example controller 220, determines if the memory address is a memory address that is being buffered. In one example, controller 220 can buffer the last external address for which it received a write request. Controller 220 must determine if the next received memory address is the same memory address as the last external address, which is currently being buffered.

In step 406, if the received memory address is being buffered, the controller determines if any buffering conditions for the memory device have been met. The buffering conditions can include, for example, a threshold number of memory writes to a memory address or a time limit during which the memory writes are being buffered as discussed above. In one example, controller 220 receives a request to write to a memory address that is being buffered and the buffering condition is based on the number of memory writes to the memory address. Thus, the controller can track the number of writes to that memory address.

In step 408, if the buffering conditions have not been met, then the data is stored in the buffer. In one example, controller 220 determines that the number of buffered writes to this address does not exceed a threshold, for example five writes. Thus, the data being stored is stored in buffer 226 rather than written to a memory location associated with the memory address. In one example, if the buffering condition is five writes to a memory address and there have been three memory writes to that address, then the controller would store the next data to be written to that address to the buffer. In addition, the memory address may also be stored to the buffer. For example, if controller 220 is buffering multiple addresses, the memory address can be stored with the data in the buffer.

In step 410, if this memory address is not being buffered or if the buffering conditions have been met, the data is written to the memory location associated with this memory address, according to the memory stack remapping process as discussed above. In one example, controller 220 determines that the number of buffered writes to the buffered address does exceed a threshold, for example five writes, controller 220 can determine the memory location associated with the memory address using the remapping process, as described above, and store the data to the associated memory location. In another example, controller 220 may wait until the buffer is full before writing the data back to the memory location. In this example, a replacement algorithm, e.g., least recently used (LRU), can be used to determine which address gets removed from the buffer and has its data stored to the corresponding memory location, using the remapping process described above.

5. Memory Failure Resolution Process

Figure 5:
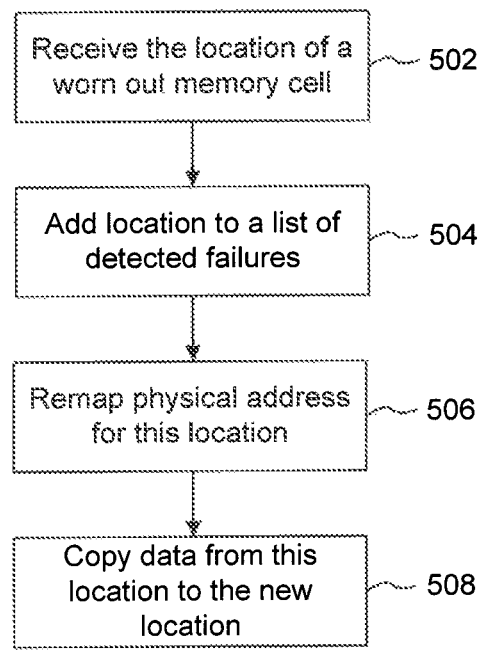
FIG. 5 is an illustration of an embodiment of a method of remapping physical addresses based on hotspot mitigation according to an embodiment.

FIG. 5 shows a flowchart depicting a method 500 according to an embodiment. For example, method 500 can be used to allow a memory device to mitigate the loss of memory locations due to memory failures without requiring the memory device to be replaced. In one example, method 500 may be performed by memory 204 to mitigate the loss of memory location 214. It is to be appreciated that method 500 may not be performed in the order shown, or require all of the operations shown. Merely for convenience, and without limitation, method 500 is described with reference to FIGS. 1-2.

In step 502, a controller receives a location of a failing memory location. The failure could be due to any number of reasons, including manufacturing defects and memory burn out. In one example, controller 220 could receive an indication that that memory location 214 has failed due to burnout.

In step 504, the controller adds the failing location to a list of failures in a failure buffer. In one example, controller 220 adds memory location 214, received earlier, to failure buffer 224, which contains all known failing memory locations.

In step 506, the controller remaps the memory address associated with the failing memory location with a new memory location. In an embodiment, this new memory location can be a memory location that is not currently mapped and is not in the failure buffer. For example, controller 220 could remap any external memory addresses associated with memory location 214 to new memory locations not in failure buffer 224. These new memory locations could be reserved memory located in reserved memory 212.

In step 508, the controller may also copy memory from the failing memory location to the new memory location. This can mitigate the loss of memory. In one example the failing portion of memory is a single bit and is smaller than the size of a memory location, say a memory word. In another example, if memory location 214 was 1 MB large, but only one byte of memory was failing, controller 220 could copy the rest of memory location 214 to a new memory, for example in reserved memory 212, in order to retain as much data integrity as possible.

In an embodiment, the locations in the failure buffer can also be used by the memory stack remapping process when reallocating memory locations. For example, when controller 220 needs to remap the next memory address, it may remove any memory locations in failure buffer 224, to make sure it does not map the memory address to a known failing memory location.

Embodiments can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

In this document, the terms "computer programmable medium" and "computer-usable medium" are used to generally refer to media such as a removable storage unit or a hard disk drive. Computer program medium and computer-usable medium can also refer to memories, such as system memory and graphics memory which can be memory semiconductors (e.g., DRAMs, etc.). These computer program products are means for providing software to an APD.

The embodiments are also directed to computer program products comprising software stored on any computer-usable medium. Such software, when executed in one or more data processing devices, causes a data processing device(s) to operate as described herein or, as noted above, allows for the synthesis and/or manufacture of computing devices (e.g., ASICs, or processors) to perform embodiments described herein. Embodiments employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventors, and thus, are not intended to limit the embodiments and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the relevant art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A memory device, comprising:
   one or more memory layers stacked on top of each other and configured to store data; and
   a logic layer coupled to the one or more memory layers, the logic layer comprising:
   an Input/Output ("I/O") port configured to receive a write command that includes a write address and data;
   a memory map, configured to:
   maintain a memory table that associates a plurality of addresses with a plurality of memory locations in the one or more memory layers; and
   return an associated memory location corresponding to the write address; and
   a controller coupled to the I/O port and the memory map, the controller configured to:
   store a number of write requests to the associated memory location;
   remap a failed memory location to a new memory location if a remapping condition has occurred in the associated memory location; and
   store the data in the new memory location.

2. The memory device of claim 1, wherein the logic layer further comprises:
a buffer coupled to the controller and configured to hold data with a same address as the write address.

3. The memory device of claim 1, wherein one memory layer of the one or more memory layers has a high write endurance and another memory layer of the one or more memory layers has a low write endurance.

4. The memory device of claim 1, wherein the logic layer further comprises:
a failure buffer configured to store failed memory locations.

5. The memory device of claim 4, wherein at least one of the memory layers further comprises a reserved memory.

6. The memory device of claim 5, wherein:
the memory map is further configured to map failed memory locations in the failure buffer to the reserved memory; and
the controller is further configured to remap the failed memory locations to the reserved memory.

7. The memory device of claim 1, wherein the memory map is further configured to associate a next address received with a subsequent sequential memory location from the memory location.

8. The memory device of claim 1, wherein the memory map is further configured to distribute the associated memory locations substantially uniformly across one or more of the memory layers.

9. The memory device of claim 1, wherein the memory layers are stacked on top of the logic layer.

10. The memory device of claim 1, wherein the controller is further configured to copy information from the associated memory location to the new memory location.

11. A method for storing data in a memory device, the memory device including one or more memory layers stacked on top of each other and configured to store data, and a logic layer coupled to the one or more memory layers, the method comprising:
receiving an address and data at the memory device;
converting the address to a memory location in one of the memory layers based on a mapping table and using the logic layer;
storing, by a memory device, a number of write requests to the memory location;
remapping a failed memory location to a new memory location, using the logic layer, if a remapping criterion has been met for the memory location; and
storing the data in the new memory location using the logic layer.

12. The method of claim 11, wherein the remapping criterion includes comparing the number of write requests to the memory location to a threshold number of writes to the memory location.

13. The method of claim 11, wherein the remapping criterion includes a threshold time since a previous remapping.

14. The method of claim 11, further comprising:
determining if an address needs to be buffered using a buffering criterion and using the logic layer; and
storing the data to a buffer if the address needs to be buffered, using the logic layer.

15. The method of claim 11, further comprising:
receiving a worn-out address at the memory device, the worn-out address identifying the failed memory location;
adding the worn-out address to a failure buffer; and
updating the mapping table, wherein the updating avoids all memory locations within the failure buffer.

16. The method of claim 15, wherein the updating uses a reserved memory to replace memory locations in the failure buffer.

17. The method for storing data in a memory device of claim 11, further comprising:
copying, by the memory device, information from the memory location to the new memory location.

18. A computer processing system, comprising:
a processing unit; and
a memory device coupled to the processing unit, the memory device comprising:
one or more memory layers stacked on top of each other and configured to store data;
a logic layer coupled to the one or more memory layers, the logic layer comprising:
an Input/Output ("I/O") port configured to receive a write command that includes a write address and data;
a memory map configured to:
maintain a memory table that associates a plurality of addresses with a plurality of memory locations in the memory layers; and
return an associated memory location corresponding to the write address; and
a controller coupled to the I/O port and the memory map, the controller configured to;
store a number of write requests to the associated memory location;
remap a failed memory location to a new memory location if a remapping condition has occurred in the associated memory location; and
store the data in the new memory location.

19. The computer processing system of claim 18, wherein the controller is further configured to copy information from the associated memory location to the new memory location.

* * * * *